United States Patent [19]

Siegfried et al.

[11] Patent Number: 4,500,323
[45] Date of Patent: Feb. 19, 1985

[54] PROCESS FOR THE GASIFICATION OF RAW CARBONIFEROUS MATERIALS

[75] Inventors: Peter Siegfried, Uttenreuth; Martin Wenger, Ingolstadt, both of Fed. Rep. of Germany

[73] Assignee: Kraftwerk Union Aktiengesellschaft, Mülheim, Fed. Rep. of Germany

[21] Appl. No.: 402,850

[22] Filed: Jul. 29, 1982

[30] Foreign Application Priority Data

Aug. 26, 1981 [DE]   Fed. Rep. of Germany ....... 3133723
Aug. 26, 1981 [DE]   Fed. Rep. of Germany ....... 3133670

[51] Int. Cl.³ .............................................. C10J 3/00
[52] U.S. Cl. .................................... 48/197 R; 48/202; 48/214 A
[58] Field of Search ..................... 48/202, 214 A, 209, 48/206, 197 R; 252/373

[56] References Cited

U.S. PATENT DOCUMENTS

| 4,113,446 | 9/1978 | Modell et al. | 48/202 |
| 4,166,802 | 9/1979 | Slater et al. | 48/202 |
| 4,318,712 | 3/1982 | Lang et al. | 48/202 |
| 4,336,034 | 6/1982 | Lang et al. | 48/202 |

OTHER PUBLICATIONS

*Coal Gasification*, Editor Lester Massey, Willson et al., author, published by Amer. Chem. Soc. 1974, pp. 202-215.

Primary Examiner—S. Leon Bashore
Assistant Examiner—Michael K. Boyer
Attorney, Agent, or Firm—Herbert L. Lerner; Laurence A. Greenberg

[57] ABSTRACT

An increased reaction velocity is achieved when gasifying a raw carboniferous material with $H_2O$. The raw material is suspended or emulsified in a liquid aqueous solution of a catalytically active salt, and the amount of the catalytically active salt and the pressure are such that the aqueous solution is maintained in the liquid phase.

13 Claims, 1 Drawing Figure

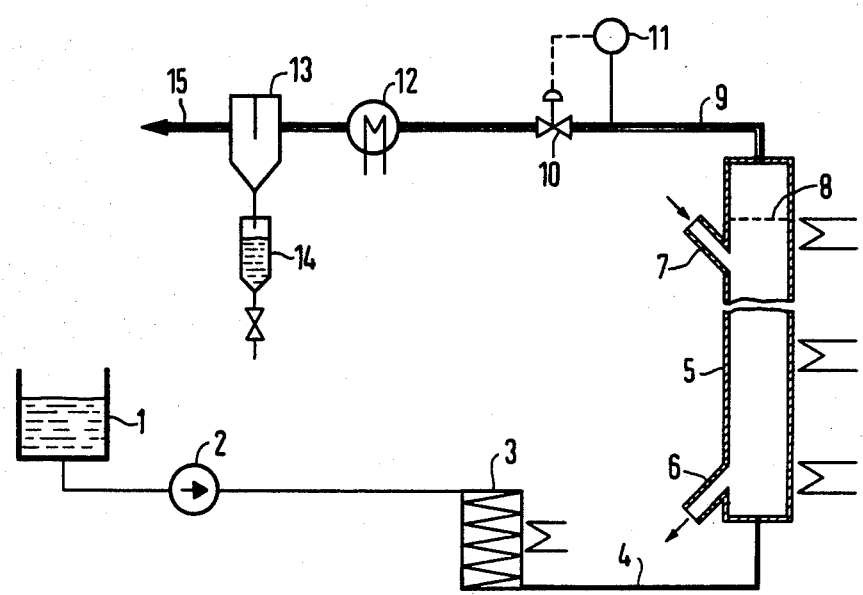

PROCESS FOR THE GASIFICATION OF RAW CARBONIFEROUS MATERIALS

BACKGROUND OF THE INVENTION

1. Field of the Invention

This invention relates to a process for the gasification of carbon-containing raw materials, especially fossil fuels and more particularly coal, coke, crude oil and fractions of the oil, by treating the material with $H_2O$ in a reaction space in the presence of a catalytically active salt.

2. Description of the Prior Art

A process of the above type is described in pages 137 to 139 of "Energy Research", Vol. 4, 137-147 (1980). According to this process an aqueous solution of potassium carbonate is sprayed as a catalytically active salt onto a raw material which consists of ground coal. The coal is then dried and fed into the reaction space of a fluidized bed reactor. In addition, $H_2O$ in the form of steam is conducted into the fluidized bed reactor so that, at a reaction pressure of 35 bars and a reaction temperature of 700° C., there occurs (a) a gasification of carbon to carbon monoxide and hydrogen, (b) a conversion of carbon monoxide to carbon dioxide and hydrogen, and (c) a reduction of CO to methane and water, according to the following overall reaction equations:

(a) $C + H_2O = CO + H_2$
(b) $CO + H_2O = CO_2 + H_2$
(c) $CO + 3H_2 = CH_4 + H_2O$

The potassium carbonate used as catalyst not only accelerates the gasification (a), but also regulates the equilibrium of the conversion (b) and of the reduction (c).

The product gases, namely hydrogen, carbon monoxide, carbon dioxide and methane, and also the water which has not been converted, leave the fluidized bed reactor. From this mixture carbon dioxide can be first removed, for example by washing with monoethanolamine. From the remaining mixture methane can be separated by low temperature distillation. The remaining hydrogen/carbon monoxide mixture can be mixed with steam again, heated to the reaction temperature and recycled to the fluidized bed reactor.

SUMMARY OF THE INVENTION

An object of the invention is to increase the reaction velocity of the gasification and to achieve thereby either an increased rate of generation of product gas (in the case of an equal temperature of reaction) or a reduced temperature of reaction (in the case of an equal rate of generation).

With the foregoing and other objects in view, there is provided in accordance with the invention, a process for the gasification of a carbon-containing raw material, which comprises reacting the material with $H_2O$ in a reaction space in the presence of a catalytically active salt, wherein the material in the reaction space is suspended or emulsified in a liquid aqueous solution of the catalytically active salt, and wherein the amount of the catalytically active salt and the pressure in the reaction space are such that the aqueous solution is maintained in the liquid phase. Other features which are considered as characteristic for the invention are set forth in the appended claims.

Although the invention is illustrated and described herein as embodied in the process for the gasification of raw carboniferous materials, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing which diagrammatically illustrates apparatus for carrying out the invention involving pumping water from a supply tank to a steam generator. The thus generated steam is introduced into the bottom of a vertical elongated column wherein an aqueous solution of a catalytically active salt is maintained in the liquid phase. Pressure control means and heating means are provided. The carbon-containing material is suspended in the liquid aqueous solution. An inlet to the reaction chamber is provided for addition of material and discharge of ash. The gas product containing unreacted steam is released from the top of the reaction column, cooled to condense $H_2O$, the water condensate separated from the gas product, and the separated gas product discharged.

DETAILED DESCRIPTION OF THE INVENTION

According to the invention, water is constantly present in the liquid phase in the reaction space. In this water the catalytically active salt is dissolved in an effectively ionogenic manner and is thereby highly mobile and therefore can accelerate to a considerable degree the gasification, particularly the gasification of carbon to carbon monoxide and hydrogen according to the overall reaction equation:

$C + H_2O = CO + H_2$.

Comparative measurements have shown that the gasification according to the invention can proceed at a reaction velocity three times that of the known process.

In order to reduce corrosion of the reaction vessel, in particular corrosion caused by molten chloride, it is preferred to use a temperature of reaction below the melting temperature of the catalytically active salt at the pressure prevailing in the reaction space of the reaction vessel.

In order that the gasification of the raw material proceeds at an adequately rapid rate, a reaction temperature above the critical temperature (approximately 375° C.) of pure $H_2O$ is advantageously chosen and obviously below the critical temperature of the body of water containing the catalytic salt in solution to maintain a liquid phase.

An aqueous salt solution which is sufficiently catalytically active is present in the reaction space at a pressure which is not too high, if the pressure in the reaction space is advantageously kept below the value above which no interphase is formed between the gaseous and liquid phases of the system $H_2O$/salt.

To maintain a continuous process of gasification, it is advantageous for the pressure in the reaction space to be maintained by means of an inflow of $H_2O$. This influx of $H_2O$ can advantageously be in the form of liquid water containing the catalytically active salt.

In an embodiment of the invention, it is preferred to use a salt mixture as the catalytically active salt. It is possible to use a relatively low pressure in the reaction space so that even the compression energy for the conveyance of the H₂O into the reaction space for maintaining the aqueous salt solution in the liquid phase is relatively small.

The invention and its advantages will now be explained in greater detail, by two embodiment examples, with reference to the drawing, which schematically shows an apparatus for carrying out the method according to the invention.

In the drawing, a supply tank 1 for water is connected via a water pump 2 to the input of an electrically heated continuous steam generator 3. The steam outlet of this continuous steam generator 3 is connected by means of a steam line 4 to the bottom of a hollow cylindrical reaction vessel 5 constructed to be maintained under pressure. This reaction vessel 5 can be heated electrically, especially at start up. A short distance from the bottom of the vessel is a lateral downward opening, designated ash discharge 6, and near the top of vessel 5 is a stub 7 for feeding-in fuel, for instance, milled coal. In the reaction space of the reaction vessel 5, intermediate the top of the reaction vessel 5 and this stub 7, is a screen 8.

A discharge line 9 for the reaction products including the unreacted steam is connected to the top of the reaction vessel 5. Interposed in discharge line 9 is a controllable expansion or relief valve 10 with a controller 11, with which a pressure sensor, which precedes the expansion valve 10 but is not shown in detail, is associated in the discharge line 9. The expansion valve 10 is further followed in the discharge line 9 by a cooler 12, and the latter by a water separator 13 with a water collecting tank 14. A discharge line 15 for the gas product is connected to the water separator 13.

According to a first embodiment example there is contained in the reaction space in the reaction vessel 5 a suspension of milled hard coal coke with a carbon content of about 85% in a liquid aqueous solution of potassium carbonate. The reaction space contains 1.8 g potassium carbonate for each gram of hard coal coke therein. The grain size of the milled hard coal coke is between 1 and 4 mm. The reaction temperature in the reaction space of the reaction vessel 5° to 650° C., and the pressure in this reaction space is 250 bar. The coke, which has a lower specific gravity than the salt-containing water, is prevented from floating by the screen 8 which is slightly below the surface of the liquid aqueous potassium carbonate solution in the reaction space of the reaction vessel 5. The content of potassium carbonate solution present in the reaction space of the reaction vessel 5 is sufficiently large to bring the level of the liquid aqueous salt solution to between the screen 8 and the top of the reaction vessel 5.

Water from supply tank 1 is forced by the water pump 2 into the inlet of steam generator 3. The steam which is generated in the continuous steam generator 3 has a temperature of 650° C., and a pressure of 250 bar, both of which are in the supercritical region of pure H₂O. This steam is fed into the bottom of the reaction vessel 5 through the steam line 4 and flows through the liquid aqueous salt solution in the reaction space of the reaction vessel 5, in which the ground hard coal coke is suspended. The reaction products including the unreacted steam are drawn off at the top of the reaction vessel 5 through the discharge line 9.

By means of the controllable expansion valve 10, the pressure in the reaction space of the reaction vessel 5 is held constant at 250 bar. Ash can be removed from the reaction vessel 5 through the ash discharge 6 and fresh milled hard coal coke can be fed into the reaction vessel 5 through the stub 7. The potassium carbonate losses caused by the discharge of ash from the stub 6 in the reaction space of the reaction vessel 5 can be compensated, if desired by admixing potassium carbonate to this hard coal coke charged-in through the stub 7. In this manner, continuous operation of the plant is possible.

The reaction products leaving the reaction vessel 5 through the discharge line 9 including the unreacted steam are cooled in the cooler 12. The water condensed in the cooler 12 is separated from the gaseous reaction products in the water separator 13 and the separated water collected in the water collecting tank 14. The product gases are from the water separator through the discharge line 15.

With the operating conditions given, a gasification rate in the reaction space of the reaction vessel 5 of 0.3% by weight carbon per minute is achieved. The composition of the product gas drawn off in the discharge line 15 is 16 volume % $CH_4$ (methane), 1 volume % CO, 36 volume % $CO_2$ and 46 volume % $H_2$.

When milled hard coal coke of the same grain size, impregnated with potassium carbonate in the same mass ratio of potassium carbonate to carbon and then dried, was treated for comparison purposes, in the reaction space of the reaction vessel 5 only in steam, in the absence of a liquid aqueous potassium carbonate solution, at a reaction temperature of 650° C. and a pressure of 100 bars, a reaction rate of only 0.1% by weight carbon per minute is obtained. Thus, in the presence of a liquid aqueous potassium carbonate solution, the gasification of the coke therefore proceeds three times as fast.

If, according to a further embodiment example, a liquid aqueous solution of a mixture of potassium chloride and sodium chloride (60% by weight KCL and 40% by weight NaCl) is used for treating the same hard coal coke as in the first embodiment example, then a product gas is obtained at the discharge line 15 with a reaction temperature of 650° C. and a pressure of 170 bar in the reaction space of the reaction vessel 5, which contains 19 volume % $CH_4$ (methane), 1 volume % CO, 30 volume % $CO_2$ and 49 volume % $H_2$. The reaction rate in the reaction space is 0.06% by weight carbon per minute.

The catalytically active salts used should be chosen from the aspect that they form with H₂O a system which can develop a liquid phase of the aqueous salt solution at the reaction temperatures of interest for the gasification of the carbon containing raw material.

The liquid phase of an aqueous salt solution differs here from a molten phase of the salt in that solid precipitated salt can exist therein if a saturation concentration of the salt is exceeded, which is not possible in the molten phase except at the triple point of the salt. In order that a liquid phase of the aqueous salt solution can develop, the salt concentration in the reaction space must be higher than the saturation concentration of the salt in the gaseous phase at the gasification temperature. Above a given critical pressure, which depends on the gasification temperature, no phase boundary surface between the liquid and the gaseous phase can exist in the reaction space.

Particularly suitable as the catalytically active salts are, in addition to potassium carbonate ($K_2CO_3$), the salts KOH, KHCO$_3$, KCl, NaCl, KBO$_2$, K$_4$P$_2$O$_7$, Na$_2$B$_2$O$_7$ and CaCl$_2$.

There are claimed:

1. A process for gasification of a liquid or solid carbon-containing material which comprises maintaining a body of water in the liquid phase in a reaction zone, said liquid body of water containing a catalyst consisting of a water-soluble salt catalytically active to accelerate the gasification of the carbon-containing material to carbon monoxide and hydrogen, dissolved ionogenically in the body of water, maintaining the body of water at a reaction temperature for gasification of the carbon-containing material and sufficient pressure to retain the body of water in the liquid phase, the reaction temperature in the reaction zone is below the melting temperature of the catalytically active salt at the pressure prevailing in the reaction zone and the reaction temperature is above the critical temperature of pure H$_2$O, introducing the carbon-containing material into the body of water, said body of water being in the liquid phase and having ionogenically dissolved therein the catalytically active salt to accelerate the gasification to convert at least part of the carbon of the carbon-containing material to gaseous products leaving an unconverted residue, releasing the gaseous products together with some water in vapor form from the reaction zone, discharging the residue from the reaction zone, introducing make-up water and catalyst into the body of water, and introducing additional carbon-containing material into the body of water in the liquid phase containing ionogenically dissolved catalyst salt for further conversion into gaseous products.

2. A process according to claim 1, wherein the body of water with dissolved catalytically active salt is maintained in the liquid phase at a temperature above the critical temperature of pure water but below the critical temperature of the body of water containing the catalytic salt in solution.

3. A process according to claim 1, wherein the carbon-containing material is a liquid, and wherein the liquid carbon-containing material is emulsified and thereby suspended in the liquid aqueous solution of the catalytically active salt.

4. A process according to claim 1, wherein the carbon-containing material is a fossil fuel.

5. A process according to claim 1, wherein the carbon-containing material is coal.

6. A process according to claim 1, wherein the carbon-containing material is coke.

7. A process according to claim 1, wherein the carbon-containing material is crude oil and fractions of the oil.

8. A process according to claim 1, wherein the pressure in the reaction space is maintained by means of an influx of H$_2$O.

9. A process according to claim 8, wherein the influx of H$_2$O is in the form of steam.

10. A process according to claim 8, wherein the influx of H$_2$O is in the form of liquid water containing the catalytically active salt.

11. A process according to claim 1, wherein a salt mixture is used as the catalytically active salt.

12. A process according to claim 1, wherein the catalytically active salt is selected from the group consisting of K$_2$CO$_3$, KOH, KHCO$_3$, KCl, NaCl, K$_4$P$_2$O$_7$, KBO$_2$, Na$_2$B$_2$O$_7$ and CaCl$_2$.

13. A process according to claim 1, wherein the catalytically active salt dissolved in the body of water is potassium carbonate.

* * * * *